United States Patent
Nakazato et al.

(10) Patent No.: US 11,605,114 B2
(45) Date of Patent: Mar. 14, 2023

(54) METHOD, MEDIUM, AND SYSTEM FOR SUPPORTING PROVISION OF EC TO OVERSEAS AND DEVICE USING SAME

(71) Applicant: zig-zag, Inc., Shibuya-ku (JP)

(72) Inventors: Kazuyoshi Nakazato, Shibuya-ku (JP); Hisashi Arakaki, Shibuya-ku (JP)

(73) Assignee: ZIG-ZAG, INC., Tokyo (JP)

( * ) Notice: Subject to any disclaimer, the term of this patent is extended or adjusted under 35 U.S.C. 154(b) by 0 days.

(21) Appl. No.: 16/639,865

(22) PCT Filed: Aug. 2, 2018

(86) PCT No.: PCT/JP2018/029140
§ 371 (c)(1),
(2) Date: Apr. 6, 2020

(87) PCT Pub. No.: WO2019/035368
PCT Pub. Date: Feb. 21, 2019

(65) Prior Publication Data
US 2020/0364762 A1    Nov. 19, 2020

(30) Foreign Application Priority Data
Aug. 16, 2017 (JP) .............................. JP2017-157289
Mar. 22, 2018 (JP) .............................. JP2018-053849

(51) Int. Cl.
*G06Q 30/00* (2012.01)
*G06Q 30/0601* (2023.01)
*G06F 16/957* (2019.01)

(52) U.S. Cl.
CPC ..... *G06Q 30/0605* (2013.01); *G06F 16/9577* (2019.01); *G06Q 30/0613* (2013.01); *G06Q 30/0631* (2013.01); *G06Q 30/0641* (2013.01)

(58) Field of Classification Search
CPC .......... G06Q 30/0605; G06Q 30/0613; G06Q 30/0631; G06Q 30/0641; G06F 16/9577
See application file for complete search history.

(56) References Cited

U.S. PATENT DOCUMENTS 9,875,284 B1 * 1/2018 Amacker .......... G06F 16/24578
2004/0093281 A1 * 5/2004 Silverstein ............. G06Q 20/04
705/26.8
(Continued)

FOREIGN PATENT DOCUMENTS

| JP | 2013-58131 | 3/2013 |
| WO | WO 2017/038739 | 3/2017 |

OTHER PUBLICATIONS https://stackoverflow.com/questions/53023899/change-onclick-action-with-a-javascript-function (Year: 2011).*
(Continued)

*Primary Examiner* — Matthew E Zimmerman
(74) *Attorney, Agent, or Firm* — Cozen O'Connor

(57) ABSTRACT

Supporting a product purchase from overseas by receiving a request for a module to support purchasing a product of an EC site from overseas from a user terminal, determining whether the module can be loaded by discerning a country of a location from which the user terminal made access, and sending a module for the EC site generated depending on setting information of the EC site to the user terminal when the determination result is positive. The module causes an input field for purchasing the product from overseas to be displayed on a web browser of the user terminal together with a product page of the product.

15 Claims, 8 Drawing Sheets

(56) References Cited

U.S. PATENT DOCUMENTS

| | | | |
|---|---|---|---|
| 2011/0004533 A1* | 1/2011 | Soto | G06Q 30/00 |
| | | | 705/27.1 |
| 2012/0016655 A1* | 1/2012 | Travieso | G06F 16/972 |
| | | | 704/2 |
| 2012/0095881 A1* | 4/2012 | Rothman | G06Q 30/0643 |
| | | | 705/27.2 |
| 2015/0088980 A1* | 3/2015 | Lakes | H04L 67/02 |
| | | | 709/203 |

OTHER PUBLICATIONS https://www.youtube.com/watch?v=zm3SxSnpLVo (Year: 2014).*
Miller, Robert C., et al. "Rewriting the web with Chickenfoot." No Code Required. Morgan Kaufmann, 2010. 39-63. (Year: 2010).*
International Search Report issued in corresponding PCT Application No. PCT/JP2018/029140.
Written Opinion issued in corresponding PCT Application No. PCT/JP2018/029140.
Parco, Buy Smart Japan, Sep. 24, 2014, 5 pages, URL: http://www.parco.co.jp.
Kakaku: Veritrans, Buy Smart Japan, Nov. 6, 2013, 2 pages, URL: http://www.kakaku.com.
BuySmartJapan youtube video, https://www.youtube.com/watch?v=1oVrHeqe04A.

* cited by examiner

*FIG.8*

```
▼ <div class="itemList"
  ▼ <div class="colorType">
    ▶ <p class="image">...</p>
      <p class="color">black</p>
    ▶ <div class="selectbox">...</div>
    ▶ <div class="actionArea 080001" style="display: block;">...</div>
      ::after
    </div>
  ▼ <div class="colorType">
    ▶ <p class="image">...</p>
      <p class="color">red</p>
    ▶ <div class="selectbox">...</div>
    ▶ <div class="actionArea 080004" style="display: block;">...</div>
      ::after
    </div>
```

METHOD, MEDIUM, AND SYSTEM FOR SUPPORTING PROVISION OF EC TO OVERSEAS AND DEVICE USING SAME

RELATED APPLICATIONS

This is a U.S. National Phase Application under 35 USC 371 of International Application PCT/JP2018/029140 filed on Aug. 2, 2018.

This application claims the priority of Japanese application no. 2017-157289 filed Aug. 6, 2017 and 2018-053849 filed Mar. 22, 2018, the entire content of which is hereby incorporated by reference.

TECHNICAL FIELD

The present invention relates to a method and program for supporting provision of Electronic Commerce (EC) to overseas as well as an apparatus that uses them.

BACKGROUND ART

In recent years, the popularization of the Internet and also smartphones have rapidly evolved, and various information can be obtained borderless. Among various kinds of websites from which information can be obtained, access from overseas to websites which offer ECs (EC sites) is also increasing. On some EC sites, even if they do not support foreign languages, a certain percentage of access numbers are from overseas.

SUMMARY OF THE INVENTION

Technical Problem

However, even if accessed from overseas, in the case of an EC site, its purpose cannot be achieved without payment and delivery unlike websites intended for disseminating information. Major system upgrades are needed in many cases and cross-border selling of products are not easy.

The present invention was made in view of such a problem, and the objective of the present invention is to facilitate cross-border EC by making purchase from overseas easier in a method and program for supporting provision of EC to overseas.

Another objective of the present invention is to provide an apparatus for supporting product purchase from overseas using the method or program.

Solution to Problem

In order to achieve such an objective, a first aspect of the present invention is a method for supporting provision of EC to overseas, comprising: user terminal displaying a display element for supporting purchasing a product from overseas together with a product page for the product on sale at an EC site on a web browser, the user terminal receiving an input to an input field for purchasing the product from overseas which is displayed in response to a part of the display element or a part of the product page being clicked or tapped, and the user terminal sending input purchase information necessary for product purchase to a server different from a server providing the EC site when an intention of product purchase corresponding to the input is indicated.

A second aspect of the present invention is a method according to the first aspect, further comprising: the user terminal causing the web browser to transfer from the product page of the EC site to a website provided by a different server when an intention of product purchase corresponding to the input is indicated.

A third aspect of the present invention is a method according to the first or second aspect, wherein the display element is superimposed on the product page.

A fourth aspect of the present invention is a method according to the third aspect, wherein the display element is displayed in a fixed manner in the lower portion of the web browser.

A fifth aspect of the present invention is a method according to any one of the first to fourth aspects, wherein the part of the product page is a button for selecting a product displayed in the product page as the subject of purchase.

A sixth aspect of the present invention is a method according to any one of the first or fifth aspects, wherein the input field includes an input field for quantity of the product.

A seventh aspect of the present invention is a method according to any one of the first to sixth aspects, wherein the input field includes an input field for at least one of color and size of the product.

An eighth aspect of the present invention is a method according to the seventh aspect, wherein the input field includes a pull-down menu for at least one of color and size of the product, and wherein the options of the pull-down menu are determined based on a description of product page display information for displaying the product page.

A ninth aspect of the present invention is a method according to any one of the sixth to eighth aspects, wherein the input field is displayed within a pop-up window.

A tenth aspect of the present invention is a method according to the ninth aspect, wherein the pop-up window is displayed as a modal window.

An eleventh aspect of the present invention is a method according to any one of the sixth to tenth aspects, wherein the input field is displayed together with an image of the product.

A twelfth aspect of the present invention is a method according to any one of the first to eleventh aspects, wherein the part of the display element is a portion other than a shopping card icon included in the display element.

A thirteenth aspect of the present invention is a method according to any one of the first to twelfth aspects, wherein an operator operating the different server is a party performing substitute purchase of one or more products to be paid.

A fourteenth aspect of the present invention is a method according to any one of the first to thirteenth aspects, wherein the display element is displayed by a first module loaded depending on a country of a location from which the user terminal made access.

A fifteenth aspect of the present invention is a method according to the fourteenth aspect, wherein the input field is displayed by a second module loaded depending on an identifier given to the EC site or each of the product pages of the EC site.

A sixteenth aspect of the present invention is a method according to the fifteenth aspect, wherein the first module and the second module are loaded as a single JS file.

A seventeenth aspect of the present invention is a method for supporting provision of EC to overseas, comprising: a user terminal displaying a product page for a product on sale at an EC site on a web browser, the user terminal receiving an input to an input field for purchasing a product from overseas which is displayed in response to a part of the product page being clicked or tapped, and the user terminal sending input purchase information necessary for product purchase to a server different from a server providing the EC site when an intention of product purchase corresponding to the input is indicated.

An eighteenth aspect of the present invention is a program for causing a computer to perform a method for supporting provision of EC to overseas, the method comprising: the computer displaying a display element to support purchasing a product from overseas together with a product page for the product on sale at an EC site on a web browser, the computer receiving an input to an input field for purchasing the product from overseas which is displayed in response to a part of the display element or a part of the product page being clicked or tapped, and the computer sending input purchase information necessary for product purchase to a server different from a server providing the EC site when an intention of product purchase corresponding to the input is indicated.

A nineteenth aspect of the present invention is a method for supporting product purchase from overseas, comprising: receiving a request for a module to support purchasing a product of an EC site from overseas from a user terminal, determining whether the module can be loaded by distinguishing a country of a location from which the user terminal made access, and sending a module for the EC site generated depending on setting information of the EC site to the user terminal when the determination result is positive, wherein the module causes an input field for purchasing the product from overseas to be displayed on a web browser of the user terminal together with a product page of the product.

A twentieth aspect of the present invention is a method according to the nineteenth aspect, wherein the module causes a display element to support purchasing the product from overseas.

A twenty first aspect of the present invention is a method according to the nineteenth or the twentieth aspect, wherein the setting information describes a format of product page display information of the EC site.

A twenty second aspect of the present invention is a method according to the nineteenth or twentieth aspect, wherein the setting information designates whether payment fraud prevention is needed at the EC site.

A twenty third aspect of the present invention is a method according to the twenty second aspect, wherein when the payment fraud prevention is needed the module includes a payment fraud prevention module.

A twenty fourth aspect of the present invention is a program for causing a computer to perform a method for supporting product purchase from overseas, the method comprising: receiving a request for a module to support purchasing a product of an EC site from overseas from a user terminal, determining whether the module can be loaded by distinguishing a country of a location from which the user terminal made access, and sending a module for the EC site generated depending on setting information of the EC site to the user terminal when the determination result is positive, wherein the module causes an input field for purchasing the product from overseas to be displayed on a web browser of the user terminal together with a product page of the product.

A twenty fifth aspect of the present invention is a method according to an apparatus for supporting product purchase from overseas which receives a request for a module to support purchasing a product of an EC site from overseas from a user terminal to determine whether the module can be loaded by distinguishing a country of a location from which the user terminal made access, wherein when the determination result is positive the apparatus sends a module for the EC site generated depending on setting information of the EC site to the user terminal, and wherein the module causes an input field for purchasing the product from overseas to be displayed on a web browser of the user terminal together with a product page of the product.

Advantageous Effect of Invention

According to one aspect of the present invention, while allowing an overseas user to make selection of products which he or she prefers to purchase in the same manner as domestic users, the burden of the EC site of dealing with selling by itself to the country in which the overseas user is located is assumed and cross-boundary EC can be easily realized.

BRIEF DESCRIPTION OF DRAWINGS

FIG. 8 shows an example of product page display information used in one embodiment of the present invention.

DESCRIPTION OF EMBODIMENTS

Hereinafter, embodiments of the present invention will be described in detail with reference to the drawings.

First Embodiment

Figure 1:
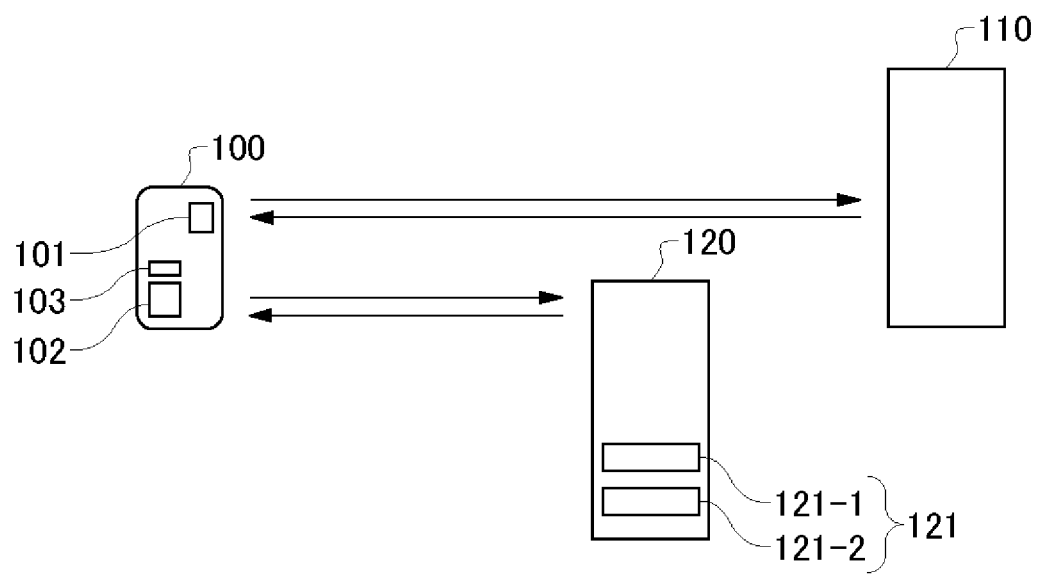
FIG. 1 is a diagram for explaining a transaction realized using the method for supporting the provision of EC to overseas according to one embodiment of the present invention.

FIG. 1 is a diagram for explaining a transaction realized using a method for supporting the provision of EC overseas according to one embodiment of the present invention. The user terminal 100 of an overseas user requests a product page for the product sold at a EC site to the first server 110 that provides the EC site (S601). The first server 110 transmits the product page display information for displaying the product page to the user terminal 100 in response to the request (S602).

The product page display information can be in the form of an HTML for displaying a web page. When the product page display information is loaded, a module 121 to support purchasing a product of the EC site from overseas is requested to the second server 120 which is different from the first server 110 (S603).

The module 121 may be composed of a general-purpose module 121-1 and an individual module 121-2 as described later in detail, and may be a file described by JavaScript (registered trademark) (hereinafter, also referred to as "JS")

for example. Also, as described later, based on the IP address of the user terminal 100, it is possible to distinguish the country of the location from which access was made by the user terminal 100 by referring to the correspondence between the IP address of the terminal and the country of the location of the terminal to determine whether the loading of the module 121 into the user terminal 100 is permitted in response to the result of the determination.

Figure 2:
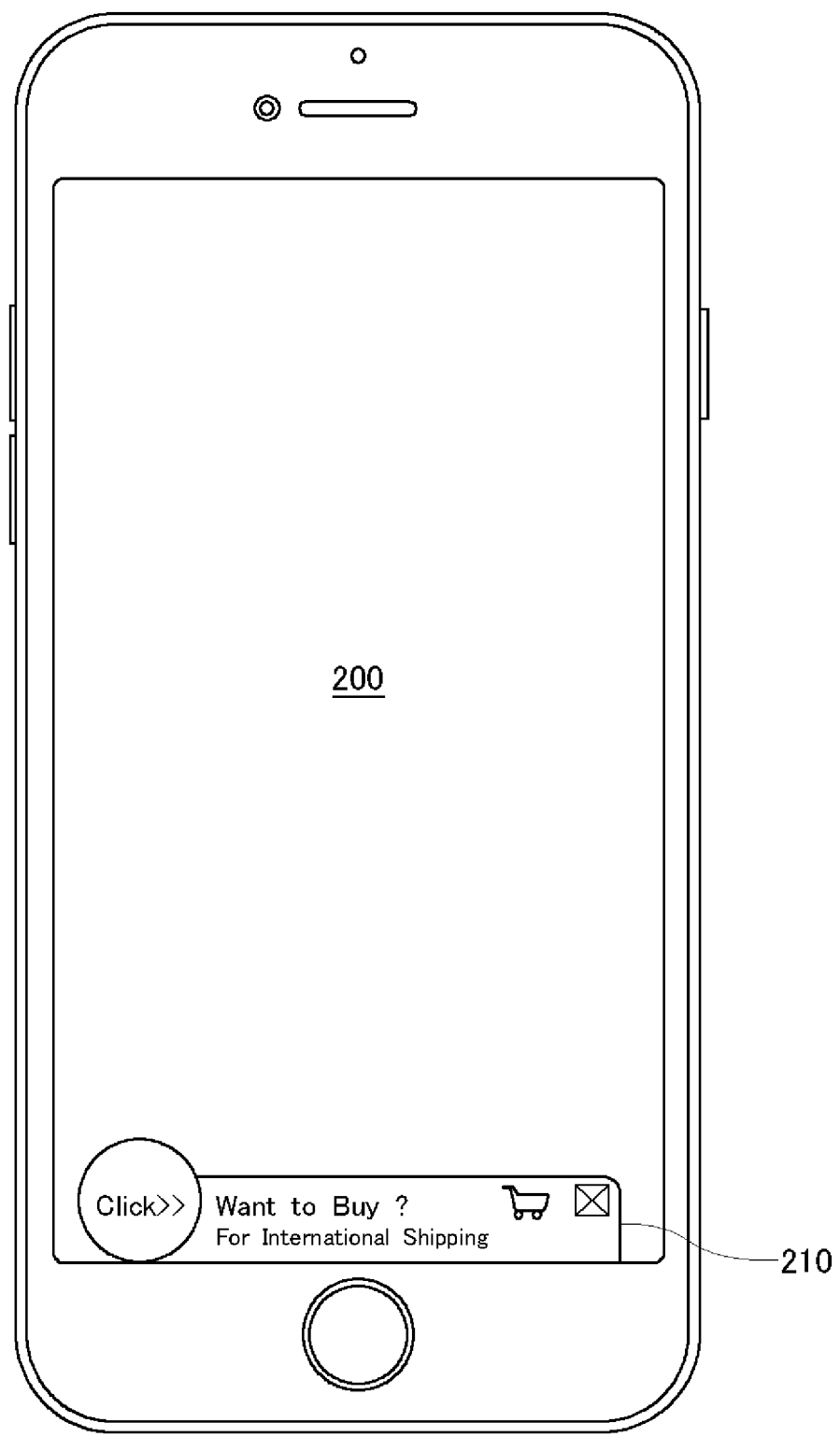
FIG. 2 shows a banner to support purchasing a product from overseas displayed by a program according to one embodiment of the present invention.

When the module 121 is loaded (S604) at the user terminal 100, a display element to support purchasing a product from overseas is displayed on the display screen of the user terminal 100 together with the product page (S701). The display element 210 may be superimposed on the product page 200 (details to be displayed are omitted), and more preferably fixed at the lower portion of the web browser as shown in FIG. 2. The display element 210 can be superimposed on the product page, for example as a floating banner or a pop-up window.

Figure 3:
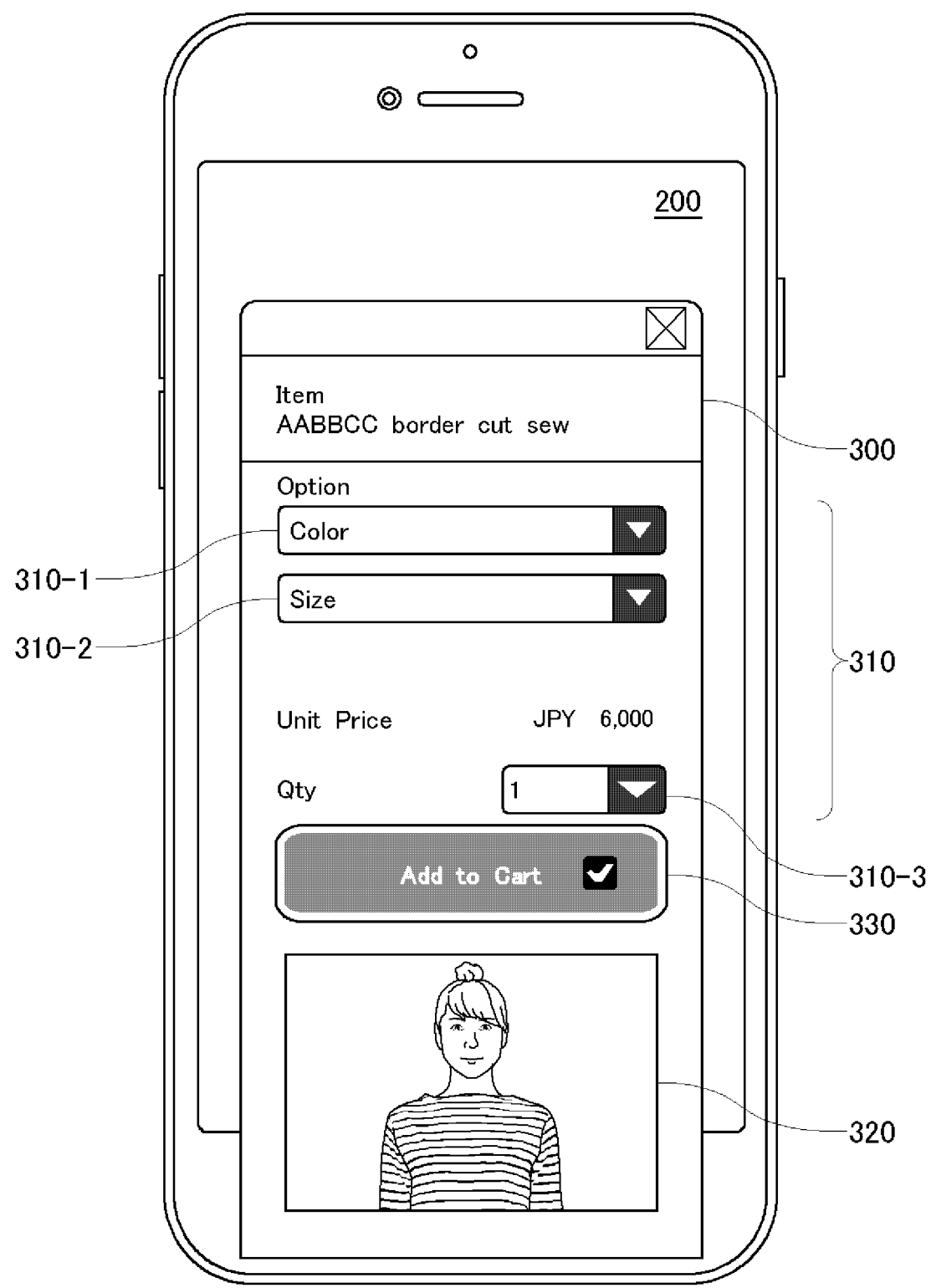
FIG. 3 shows an example of a modal window displayed when a part of the banner of FIG. 2 is clicked or tapped.
Figure 5:
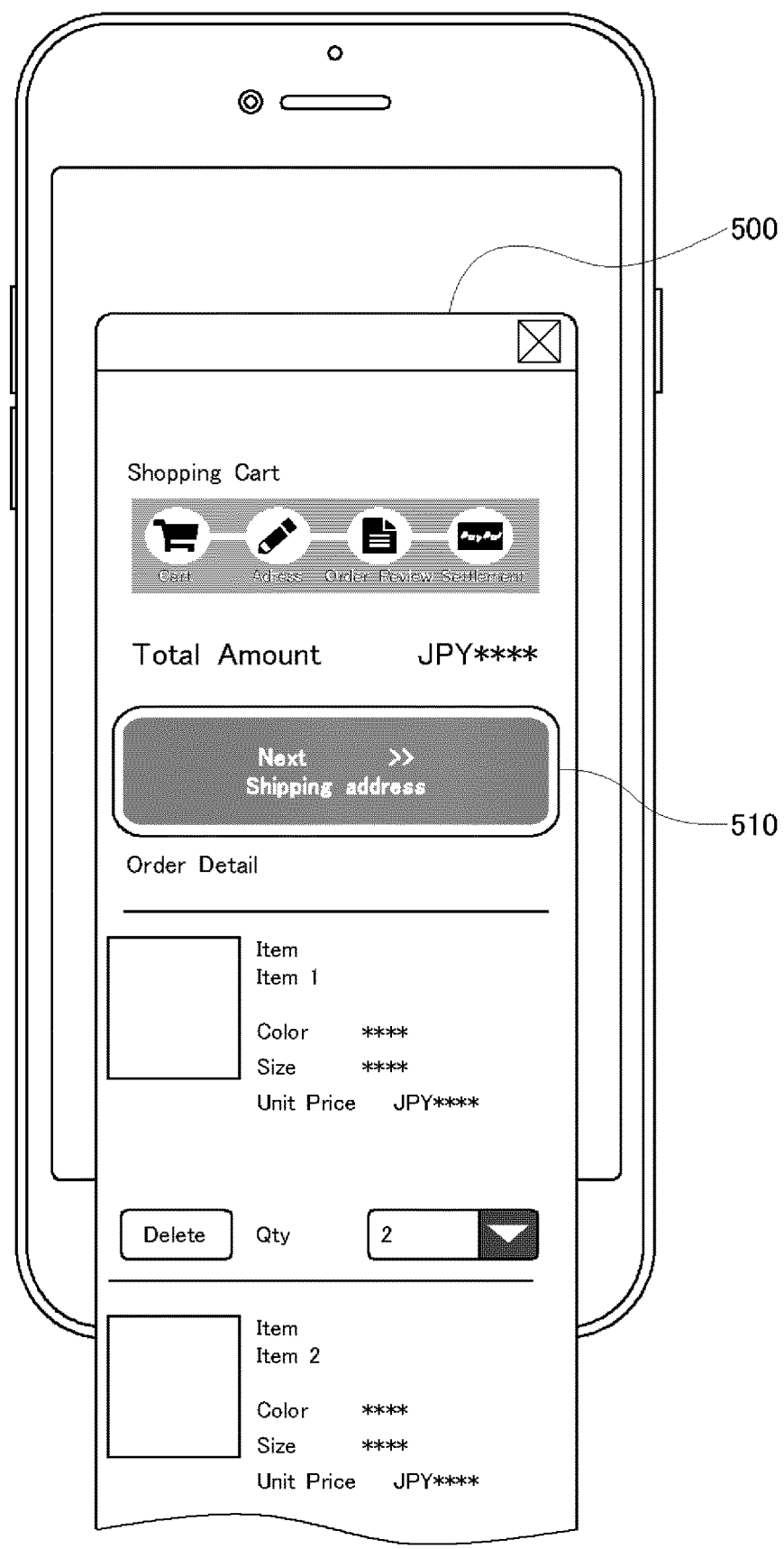
FIG. 5 shows an example of the modal window displayed when the shopping cart icon of FIG. 4 is clicked or tapped.
Figure 6:
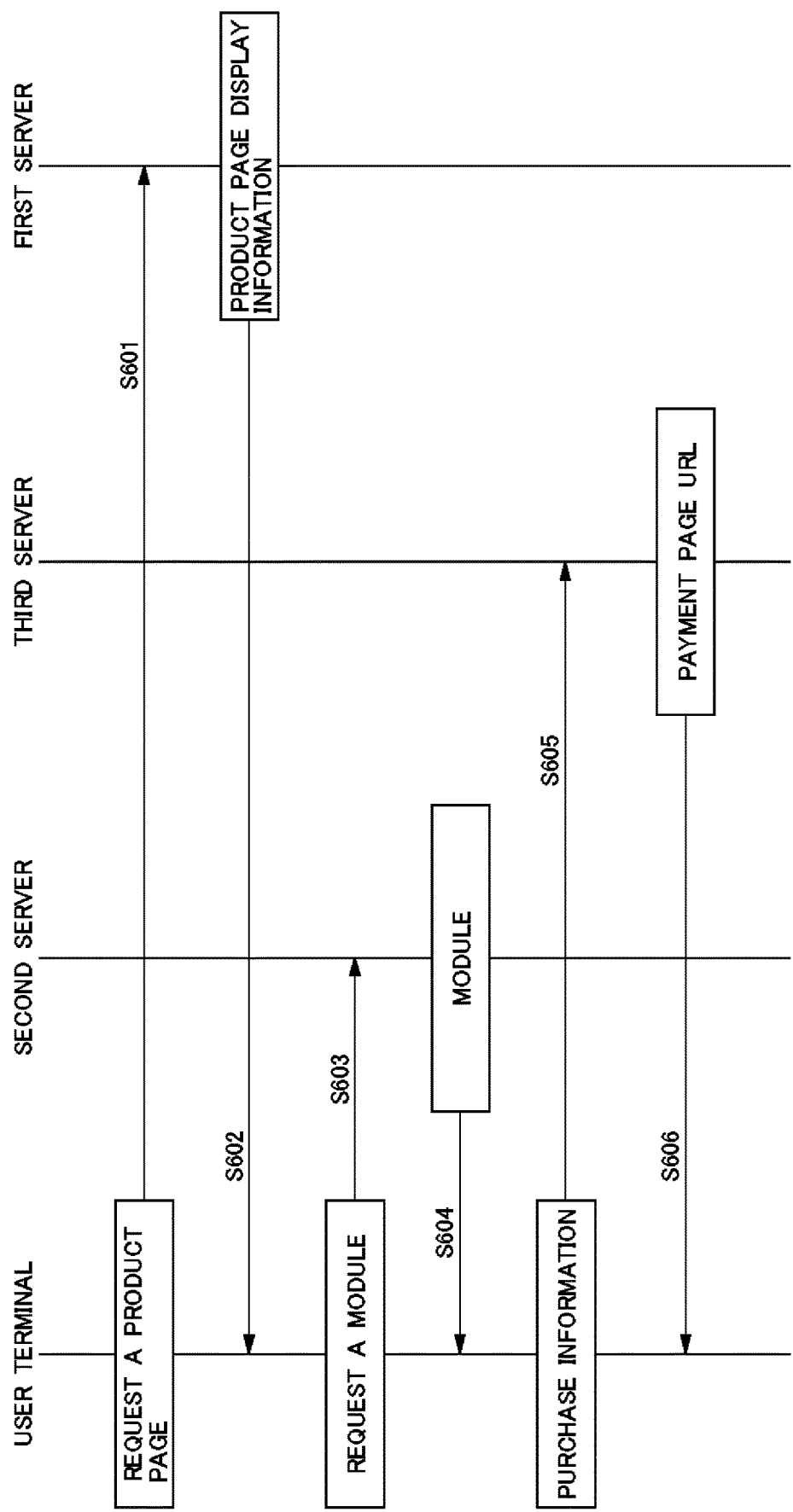
FIG. 6 shows the exchange of information between devices according to one embodiment of the present invention.
Figure 7:
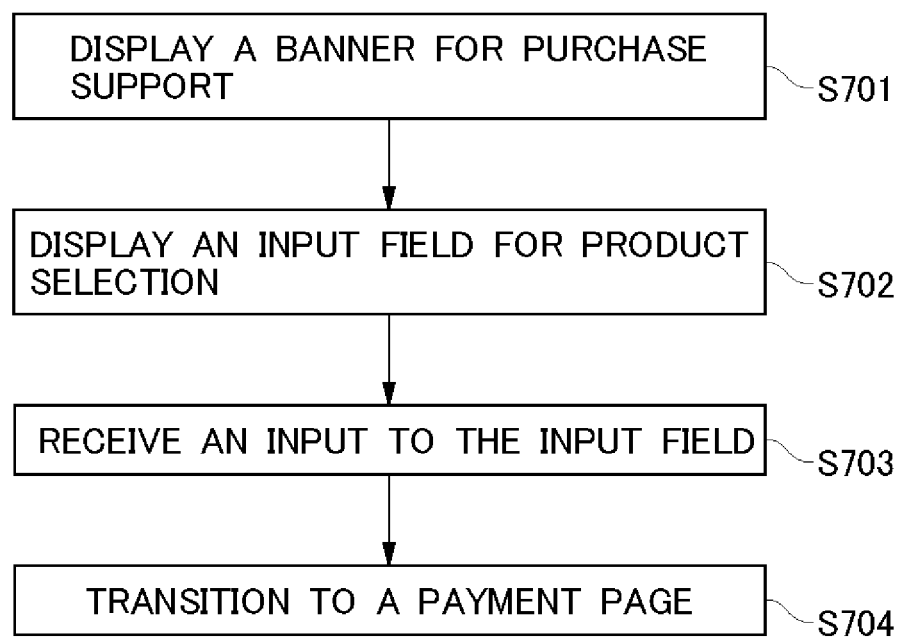
FIG. 7 is a flow diagram of the method for supporting the provision of EC to overseas according to one embodiment of the present invention.

When a part of the display element 210 is clicked or tapped while the product page 200 is displayed, the user terminal 100 displays an input field for purchasing the product from overseas (S702). The input field 310 may be displayed within a pop-up window 300, as illustrated in FIG. 3, and the pop-up window 300 may be displayed as a modal window that restricts operations on the parent window or parent screen until a user response is received. In FIG. 3, a pop-up window 300 is shown as extending beyond the display screen of the user terminal 100 because it includes an area that is displayed when scrolled. The same applies to FIG. 5, which will be referred to below.

In addition to when a part of the display element 210 is clicked or tapped, the input field 310 may also be displayed when an 'Add to Cart' button (not shown) displayed in the product page 200 is clicked or tapped, i.e., when a button for selecting the product displayed in the product page 200 as the purchase target is clicked or tapped. At an EC site, users are familiar with checking the contents of their shopping cart after placing one or more products in the shopping cart to proceed to purchase, and it was found that they often clicked or tapped the 'Add to Cart' button without noticing the presence of the display element 210 or clicked or tapped the 'Add to Cart' button which they are more familiar with. Therefore, by guiding to the flow of purchase using the display element 210 even if the "Add to Cart" button shown in product page 200 is selected, purchase from overseas can be enabled. A constant number of users are unconditionally frustrated with additional display elements such as banners, pop-ups, and the like, and by associating with an element shown in the product page 200 wariness against the display element 210 is alleviated.

It is also possible to display the display element 210 to support purchasing from overseas in the vicinity of the button for selecting a product as the purchase target, such as the "Add to Cart" button. This strengthens the relationship with a UI with which users are familiar and facilitates clicks or taps on the display element 210. One example is placing it below and adjacent to the "Add to Cart" button.

The input field 310 may include an input field 310-3 for quantity of a product. By displaying the input field 310-3 below the unit price of the product, it is less likely to cause uncertainty as to whether it is a sum or a unit price.

The input field 310 may include at least one of a color input field 310-1 and a size input field 310-2. The color input field 310-1 and size input field 310-2 can be in the form of pull-down menu, and the choices in a pull-down menu can be determined based on the description of the product page display information for displaying the product page 200, as described later. Since the format of the product page display information varies from EC site to EC site, an individual module 121-2 for performing an analysis for each EC site may be generated and executed on a click or a tap of the display element 210. Additionally, additional fields needed for each EC site may be provided to specify an SKU.

In view of the fact that product purchases are carried out by overseas users, in order to visually inform overseas users that the purchase procedure is proceeding for the intended product, the input field 310 is preferably displayed with an image 320 of the product. The image 320 may be an image of the product itself or an image when a product is worn, or it may be a captured image of the product page 200. Since a plurality of images are often displayed within the product page 200, it may not be easy to distinguish which image is the image of the product itself. By capturing the product page 200, the image 320 can be displayed without performing such distinction.

The user terminal 100 accept inputs to the displayed input field 310, for example, in response to the clicking or tapping of an add button 330 for adding to the shopping cart.

Figure 4:
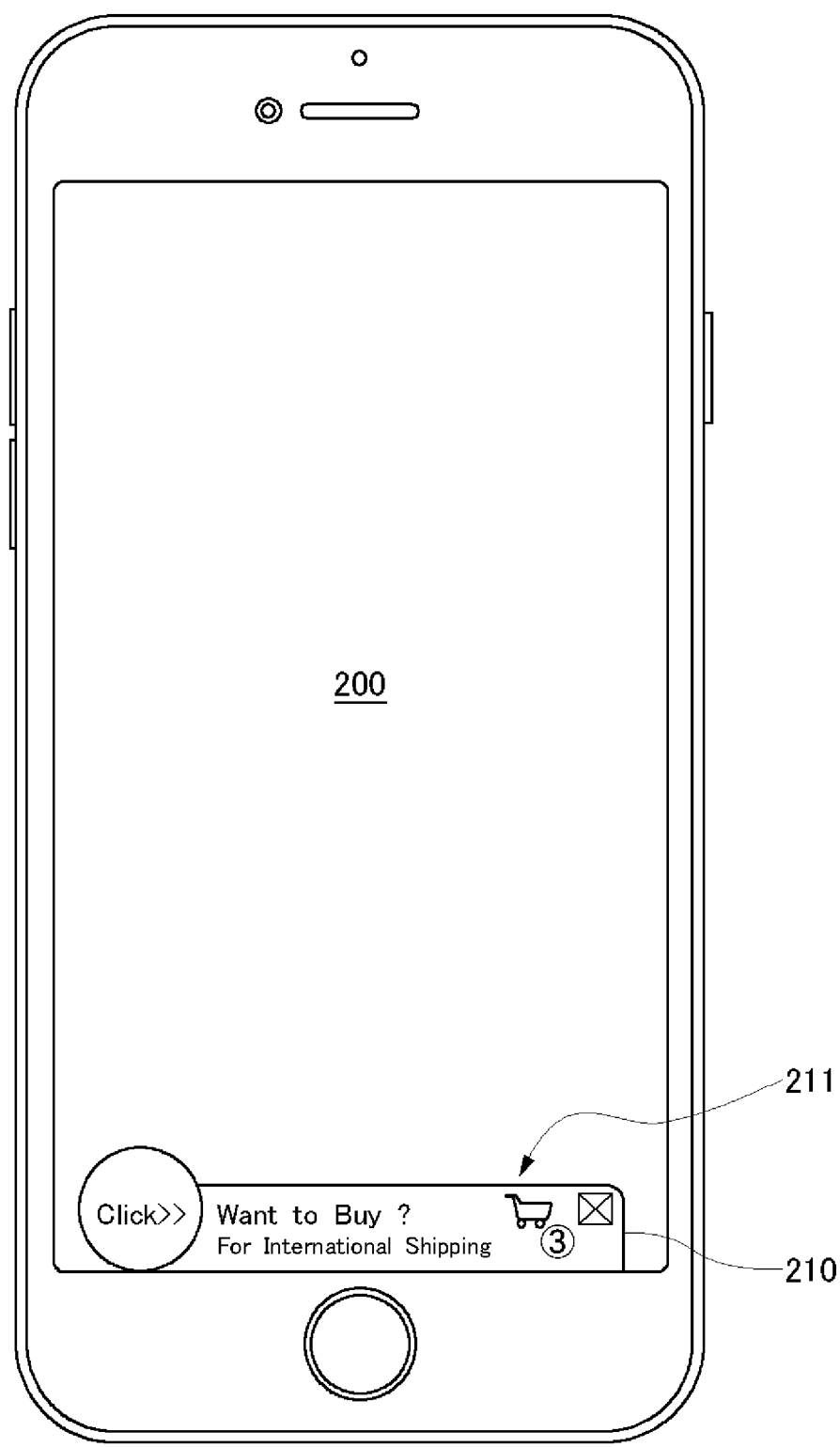
FIG. 4 shows the banner after input is made in the modal window of FIG. 3.

Once the inputs required to select the product is made and stored locally at the user terminal 100, an indication may be made within the display element 210 which shows the presence of a product to be purchased. In FIG. 4, the shopping cart icon 211 is displayed within the display element 210 along with the number of products to be purchased.

The display element 210 may be displayed in the same way even if a transition to another product page is made. By displaying the input field 310 similar to FIG. 3 when a part of the display element 210 other than the shopping cart icon 211 is clicked or tapped in the page, selection of a plurality of products is made easy. When a transition is made to the top page, etc. rather than a product page that explains an individual product at an EC site, the input field 310 may not be displayed even if a part of the display element 210 other than the shopping cart icon 211 is clicked or tapped. For example, explanatory information explaining the purchase procedure from overseas using the display element 210 may be displayed. Also, it is preferable to adopt different representations for the display element 210 between the product page 200 and other pages so as to represent the difference of responses to user operations to display element 210.

When an intention is indicated to proceed with the purchase procedure of the product, such as by clicking or tapping the shopping cart icon 211 or the number of products to be purchased, confirmation screen 500 of the contents of the shopping cart, i.e., the products to be purchased is displayed. In the confirmation screen 500, if the intended products are found, transition is made to the address input screen for the shipping address by clicking or tapping the button 510 for proceeding to the next step. When the user has finished entering the shipping address information, the user indicates the intention to proceed to the payment. These entries and indications may be made on separate screens, as shown, or on the same screen. The total amount for which the user agrees to pay here may be the sum of the product amounts plus the fees for the substitute purchase services described below.

An indication of the intention to proceed with the purchase procedure can also be considered to have been made by clicking or tapping the shopping cart icon (not shown) displayed on product page 200. As described above, users have become familiar with the process of moving to purchase after checking the contents of the shopping cart in which the user has placed one or more products. It was found that they often click or tap the shopping cart icon on the product page 200 rather than the shopping cart icon 211 on the display element 210. In such cases, the purchase procedure can be continued by guiding the user to the purchase flow using display element 210.

When an indication of the intention of proceeding to payment by the user or an indication of the product purchase corresponding to the input to the input field 310 is made, the user terminal 100 causes the Web browser to transition from the product page of the EC site to a Web-site provided by a third server (not shown) different from the first server 110 providing the EC site. Here, the third server may be the same as the second server 120, but it is not necessary so.

More specifically, when an indication is made to proceed to payment by the user, the user terminal 100 sends the input purchase information required for the product purchase to the third server (S605). The purchase information is stored with the order ID of each order on a third server or storage medium or storage device accessible from the third server, and includes product information about the selected product and delivery destination information about the delivery destination. The third server transmits to the user terminal 100 the URL of a payment page identified by an order ID or corresponding key as a destination of forwarding or transition (S606). The Web browser of the user terminal 100 transitions to the above-mentioned Web site in response to the reception of the URL.

In this embodiment, payment is made from the destination Web site of the transition, and the operator that operates the Web site performs substitute purchase of a product in order to support provision of EC to overseas. Based on the purchase information sent to the third server, the product's purchase from the EC site is actually made in the country where the operator of the EC site is located or the country where the EC site can make delivery, and the product is received at its shipping address. After receiving the product, the operator or its designated vendor inspects and packs the product to deliver it to an overseas user.

As described above, for a user accessing an EC site from overseas, more precisely, for a user who accessed the EC site from a country other than the country where the operator is located or the country where the EC site can make delivery, selection of products for which the purchase is desired on the EC site is made possible. At the same time, the payment procedure is performed from the website operated by the substitute purchase agent on behalf of the operator of the EC site, Therefore, the operator of the EC site can respond widely to the demand from overseas users without increasing its own countries to which it can make delivery. In particular, using a method according to the present embodiment, the operator of the EC site can easily provide cross-boundary support by only embedding a line of description for loading the module 121 into each product page provided by the first server 110. Overseas users will be able to purchase from the website they accessed for the first time without being prompted to make any special settings.

In addition to or in lieu of displaying the input field 310 in response to a click or tap of a part of the display element 210, the input field 310 may be displayed in response to a click or tap of a part of the product page 200, for example, a button for selecting a product displayed on the product page 200 as a purchase target, whereby blocking a path for overseas users accessed from a predetermined country to directly perform payment on the EC site, and the payment is always made from a website provided by a third server to which the user has transitioned. In this way, the operator operating the third server can take over the risk of payment frauds from overseas where many EC sites are unable to deal with, and EC sites that are unfamiliar with cross-border handling can be protected from payment frauds. Similar advantage can be obtained by displaying a confirmation screen 500 for the products to be purchased in response to a part of the product page 200, for example, a button to select the product displayed in product page 200 as a purchase target being clicked or tapped.

Here, an example in which the delivery destination information is input on the EC site is explained. It is conceivable that this is input on the payment page which is the destination of transition. However, in order to reduce the possibility of causing the accessing user to leave from the discomfort of "transitioning to another site", it is preferable to have the delivery destination information input at the original EC site.

When a user's intention to proceed with the payment is indicated, the payment page URL is sent as a redirect destination, but in addition to this, an e-mail containing the payment page URL may be sent to the user. In this manner, even if the redirect fails or is delayed due to communication conditions or the like, the user can access the payment page.

The user terminal 100 is a computer comprising a communication unit 101 such as a communication interface, a processing unit 102 such as a processor and a CPU, and a storage unit 103 including a storage device or a storage medium such as a memory or a hard disk, and can be configured by executing a program for performing all or a part of the processing described above on the processing unit 102. The program may include one or a plurality of programs, and may be recorded in a computer-readable storage medium to form a non-transient program product.

As a matter of course, it is assumed that a "server" can be composed of a single server or a plurality of servers that can communicate with each other on a computer network. A "program" executed on the server is also assumed to include one or more programs executed on the server or servers. Each server includes a communication unit, a processing unit, and a storage unit (not shown) similar to the user terminal 100.

Also, it should be noted that it is assumed in the present Specification that additional information may also be considered if the term "only" is not written such as in the expressions "only based on x x," "depending only on x," and "only in the case of x."

As a precaution, even though there is an aspect of a method, program, terminal, device, server, or system (hereinafter referred to as "method, etc.") that perform an operation different from that described herein, each aspect of the present invention is directed to an operation that is same as the operations described herein, and it is said that having an operation different from the operations described in the present Specification does not make the method, etc. outside of the scope of each aspect of the present invention.

IP Distinction

When a request for the module 121 is transmitted from the user terminal 100 to the second server 120 (S603), at the second server 120, it is determined whether to load the module 121 into the user terminal 100 depending on the IP address allocated to the user terminal 100. Other than using the IP address allocated to the user terminal 100, when the user terminal 100 is a mobile terminal, a country of the location of the user terminal 100 can be estimated based on the GPS location information, the location information of the base station for wireless communication, and the like.

As an example, if the country of the location of the user terminal 100 estimated by the IP address is the country of the location of the operator of the EC site provided by the first server 110, the module 121 is unnecessary because it can be delivered domestically to the user terminal 100 by making the purchase at the EC site. Similarly, if the country of the location of the user terminal 100 is located is included in the dispatchable countries of the operator of the EC site, the module 121 can be determined to be unnecessary.

In addition, the country of the location of the user terminal 100 estimated at the second server 120 may be a country for which products cannot be sold for the EC site depending on the product. For example, trademarks, contracts, etc. can be reasons. It can be determined that the module 121 cannot be loaded if accessed from such a country where selling a product is not possible. At the second server 120, a list of countries for which selling a product is not possible for each product can be held and when it matches transmission of the modules 121 can be denied.

Alternatively, the countries where selling a product is prohibited can be designated in the product page display information when there are prohibited countries for selling the product and the user terminal 100 may determine whether to permit selling the product by checking this designation when the module 121 is loaded. If the country of location of the user terminal 100 estimated at the second server 120 is included in the module 121 or transmitted to the user terminal 100 together with the module 121, a match or mismatch between the country of the location of the terminal and the country where selling a product is prohibited can be determined at the user terminal 100. For example, describing in a product page as below, the United States and Italy can be designated as countries where the product cannot be sold.
<p hidden class="deny-countries">
[US, IT]
</p>
If selling a product is not permitted, processes such as not displaying the display element 210, or displaying the display element 210 but describing an explanation such as "This product cannot be delivered to your country" in the display element 210 can be performed. When the display element 210 is displayed as the latter, it is preferable not to display the input field 310 for purchasing a product from overseas even if the display element 210 is clicked or tapped.

Module

When the module 121 is requested from the user terminal 100 to the second server 120 (S603), at the second server 120, a module 121 adapted to the EC site accessed by the user terminal 100 is generated.

As an example, the following JS script is written in the product page of the relevant EC-site:
<script type="text/javascript" src="https://checkout-api.x-xxx.jp/v1/script?token=xyz"></script>

Here, "checkout-api.xxxx.jp" indicates the second server 120 and "token=xyz" indicates that the identifier for identifying the EC site provided by the first server 110 is "xyz." The setting information of the EC site corresponding to the identifier is prepared in advance in the second server 120 or a storage device or storage medium accessible therefrom, and a module 121 based on the setting information is generated.

In other words, since the format of the product page display information varies from EC site to EC site, it is desirable to set which information is described in which part of the product page display information for each EC site. In the example shown in FIG. 8, the color choices are described in the portion of "colorType.color". By making these settings in the setting information, when the module 121 operates on the product page, the pull-down menu for the color input field 310-1 can be dynamically displayed using the product page display information of the product page.

The process of displaying the input field 310 when the "Add to Cart" button displayed in the product page 200 is clicked or tapped can also be described in the module 121. The same applies when the shopping cart icon displayed on the product page 200 is clicked or tapped. More specifically, the "Add to Cart" button is generally described as below:
<input type="button" value="Check" onclick="(action to put in cart)">
By rewriting the value of the onclick attribute to (the action of displaying the input field 210) when the module 121 is loaded at the user terminal 100, the user can be guided to the purchase flow using the display element 210.

For example, The setting information for each EC site prepared on the second server 120 or storage medium or storage device accessible therefrom may include whether payment fraud prevention is needed, and when prevention is needed, a module for displaying an input field 310 or a confirmation screen 500 in response to the clicking or tapping of a part of the product page 200 such as a button for selecting a product displayed in the product page 200 as a purchase target can be loaded by the user terminal 100 as a part of the individual modules 121-2. The module is sometimes referred to as a payment fraud prevention module. Alternatively, whether payment fraud prevention is needed can be designated in the product page display information of each product page and whether prevention is needed can be determined at the user terminal 100 side by checking this designation when the individual module-212 is loaded.

Although the module 121 may be distinguished between an individual module 121-2 that need to be generated for each EC site or for each product page of an EC site and a general purpose module 121-1 that are common to each EC site, these may be treated as a single JS file.

Second Embodiment

In the first embodiment, when the product purchase intention corresponding to the inputs to the input field 310 displayed in the product page of the EC site is indicated, the web browser of the user terminal 100 is transferred from the product page 200 of the EC site to the web site provided by a third server different from the first server 110 that provides the EC site. In the second embodiment, although the transmission of the input purchase information required for the product purchase (corresponding to the S605) to the third server continues, the payment is performed from the pop-up window 300 displayed on the product page 200 without being transferred to the web site by the third server.

Although it may vary depending on the payment method available on the EC site, the operator that operates the third server may perform substitute purchase of a product, after sending the part or all of the purchase information required for product purchase such as product name or product ID, number, amount, etc. to the payment server for payment (not shown) and if needed after the completion of the payment.

As described above, by making payment directly possible from the EC site, the departure rate due to transition to another site can be lowered. On the other hand, it is necessary to include payment means information for calling the payment means in the setting information to be prepared for each EC site or each product page, which complicates the settings at the second server 120 for each EC site.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A machine-implemented method for supporting product purchase from overseas, comprising:
   a supporting server receiving a request for a module to support purchasing a product of an electronic commerce (EC) site from overseas from a user terminal, wherein the supporting server is different from an EC server providing a product page of the product;
   the supporting server distinguishing a country of a location from which the user terminal made access to the product page;
   the supporting server sending the module for the EC site, the module generated depending on setting information of the EC site, to the user terminal when the product is sellable to the country, and
   the user terminal executing the module to cause a display element for purchasing the product from overseas to be superimposed on the product page of the EC site on a web browser of the user terminal,
   wherein the module includes a payment fraud prevention module executable to rewrite a value of an onclick attribute of an add-to-cart button of the product page.

2. The method according to claim 1, wherein the setting information describes a format of product page display information of the EC site.

3. At least one non-transitory computer-readable medium containing instructions that, when executed by a first computer, cause the first computer to perform operations for supporting product purchase from overseas, the operations comprising:
   receiving a request for a module to support purchasing a product of an electronic commerce (EC) site from overseas from a user terminal, wherein the first computer is different from an EC server providing a product page of the product;
   distinguishing a country of a location from which the user terminal made access to the product page; and
   sending the module for the EC site, the module generated-depending on setting information of the EC site, to the user terminal when the product is sellable to the country-, the module being executable on the user terminal to cause a display element for purchasing the product from overseas to be superimposed on the product page of the EC site on a web browser of the user terminal,
   wherein the module includes a payment fraud prevention module executable to rewrite a value of an onclick attribute of an add-to-cart button of the product page.

4. The at least one non-transitory computer-readable medium according to claim 3, wherein the setting information describes a format of product page display information of the EC site.

5. An apparatus for supporting product purchase from overseas, the apparatus comprising:
   computing hardware, including communications, processing, and storage devices, the computing hardware being operative to:
   receive a request for a module to support purchasing a product of an EC site from overseas from a user terminal;
   distinguishing a country of a location from which the user terminal made access to the product page; and
   send the module for the EC site, the module generated depending on setting information of the EC site, to the user terminal when the product is sellable to the country-, the module being executable on the user terminal to cause a display element for purchasing the product from overseas to be superimposed on the product page of the EC site on a web browser of the user terminal,
   wherein the module includes a payment fraud prevention module executable to rewrite a value of an onclick attribute of an add-to-cart button of the product page.

6. The apparatus according to claim 5, wherein the setting information describes a format of product page display information of the EC site.

7. The method according to claim 1, wherein the display element superimposed on the product page is an input field for purchasing the product from overseas.

8. The method according to claim 7, wherein the input field is for selecting at least one of color and size of the product.

9. The at least one non-transitory computer-readable medium according to claim 3, wherein the display element superimposed on the product page is an input field for purchasing the product from overseas.

10. The at least one non-transitory computer-readable medium according to claim 9, wherein the input field is for selecting at least one of color and size of the product.

11. The apparatus according to claim 5, wherein the display element superimposed on the product page is an input field for purchasing the product from overseas.

12. The apparatus according to claim 11, wherein the input field is for selecting at least one of color and size of the product.

13. A machine-implemented method for supporting product purchase from overseas, comprising:
   a supporting server receiving a request for a module to support purchasing a product of an electronic commerce (EC) site from overseas from a user terminal, wherein the supporting server is different from an EC server providing a product page of the product;
   the supporting server-distinguishing a county of a location from which the user terminal made access to the product page to send the country-to the user terminal;
   the supporting server sending the module for the EC site, the module generated depending on setting information of the EC site, to the user terminal, and
   the user terminal executing the module to, when the product is sellable to the country, cause a display element for purchasing the product from overseas to be superimposed on the product page of the EC site on a web browser of the user terminal,
   wherein the module includes a payment fraud prevention module executable to rewrite a value of an onclick attribute of an add-to-cart button of the product page.

14. At least one non-transitory computer-readable medium containing instructions that, when executed by a first computer, cause the first computer to perform operations for supporting product purchase from overseas, the operations comprising:
   receiving a request for a module to support purchasing a product of an electronic commerce (EC) site from overseas from a user terminal, wherein the first computer is different from an EC server providing a product page of the product;

distinguishing a county of a location from which the user terminal made access to the product page to send the country to the user terminal; and sending the module for the EC site, the module generated depending on setting information of the EC site, to the user terminal, the module being executable on the user terminal to, when the product is sellable to the country, cause a display element for purchasing the product from overseas to be superimposed on the product page of the EC site on a web browser of the user terminal, wherein the module includes a payment fraud prevention module executable to rewrite a value of an onclick attribute of an add-to-cart button of the product page.

15. An apparatus for supporting product purchase from overseas, the apparatus comprising:

computing hardware, including communications, processing, and storage devices, the computing hardware being operative to:

receive a request for a module to support purchasing a product of an EC site from overseas from a user terminal;

e-distinguish a country of a location from which the user terminal made access to the product page to send the country determination to the user terminal; and send the module for the EC site, the module generated depending on setting information of the EC site, to the user terminal, the module being executable on the user terminal to, when the product is sellable to the country, cause a display element for purchasing the product from overseas to be superimposed on the product page of the EC site on a web browser of the user terminal, wherein the module includes a payment fraud prevention module executable to rewrite a value of an onclick attribute of an add-to-cart button of the product page.

* * * * *